3,516,955
CURABLE COMPOSITIONS CONTAINING AN
EPOXY, AN UNSATURATED POLYESTER,
AND A POLYMERIZABLE VINYL MONOMER
David D. Taft, Minneapolis, Minn., assignor to Ashland
Oil & Refining Company, Ashland, Ky., a corporation
of Kentucky
No Drawing. Filed May 31, 1966, Ser. No. 553,623
Int. Cl. C08f 21/04; C09d 3/68
U.S. Cl. 260—22                                    10 Claims

ABSTRACT OF THE DISCLOSURE

A composition which comprises:
(a) an epoxy component;
(b) an unsaturated polyester having an acid value of at least 50; and being the esterification reaction product of polycarboxylic acid and polyhydric alcohol wherein the ratio of carboxyl groups to hydroxyl groups before esterification is from 1:1 to 3:1; the polycarboxylic acid being a mixture of polycarboxylic acids comprised of 5–90 mole percent copolymerizable ethylenically unsaturated polycarboxylic acid and at least 5 mole percent hexachloroendomethylene tetrahydrophthalic acid; and
(c) a polymerizable vinyl monomer such as styrene.

These compositions find utility as decorative or protective coatings for substrates such as those of wood, metal, etc.

DISCLOSURE

The present invention relates to curable compositions containing an epoxy, an unsaturated polyester, and a polymerizable vinyl monomer. In one aspect, this invention relates to a multiple-package coating system containing, in a first package, a curable epoxy component (e.g. expoxidized soybean oil) and, in a second package, an unsaturated polyester which has been diluted with a polymerizable vinyl monomer. When mixed together in the presence of a suitable catalyst, the contents of these two packages are capable of reacting to form hard, flexible, mar-resistant films on a variety of substrates (e.g. wood, metal, concrete, and the like).

In U.S. Pat. 3,218,274 (which is incorporated herein by reference) Robert A. Boller and Dr. Richard B. Graver have described and claimed a two-package coating composition. One of the two packages contained a curable epoxidized fatty compound (e.g. epoxidized soybean oil). The other package contained an acidic polyester curing agent for the epoxidized fatty compound of the first package. At or about the time of use, the contents of the two packages were mixed and the resulting mixture spread in film-form on a suitable substrate (e.g. wood) and cured (e.g. by baking or air drying) to thereby provide a decorative or protective coating.

One significant advantage of a preferred embodiment of that two-package coating system has been its ability to form thin films which cure at room temperature (without a requirement for a catalyst) to form hard, tack-free, mar-resistant, durable coatings. Less preferred embodiments are cured by baking. Cured coatings (e.g. coatings on wood or metal) prepared from this two-package coating system have exhibited highly desirable properties in terms of (1) their non-yellowing tendency, (2) their ability to retain their original hard gloss for years without fading (although they can be made with a low gloss), (3) their durability, (4) their ability to be applied by brushing, spraying or rolling on common substrates such as wood, concrete, and metal, and (5) the ease with which dirt and common stains can be removed. On concrete or earthenware, this coating system provides a glazed, ceramic-like appearance.

I have discovered that by preparing polymerizable unsaturated acidic polyesters of the general type shown in U.S. 3,218,274 and diluting the unsaturated polyesters with a polymerizable solvent, it is possible to improve certain properties (e.g. to improve the caustic resistance) of the cured films obtained therefrom. I have also discovered that by using my solutions of unsaturated polyesters, I am able to obtain useful films (both free and supported) by co-reaction with a wide variety of epoxy materials. While I generally prefer to employ epoxidized fatty compounds (e.g. epoxidized linseed oil) as the primary or sole epoxy component, I can also use other epoxidized compounds as part or all of the epoxy component. Thus, my solutions of unsaturated polyesters can be used as curing agents for or coreactants with, bisphenol-epichlorohydrin resins (e.g. Epon 828) as well as alicyclic diepoxides (e.g. Unox 201). Good results have been obtained using these non-fatty epoxidized compounds as the sole epoxy component.

My coating system also offers other advantages. For example, my system allows one to use a low viscosity mixture of epoxy and polyester which facilitates the application of the mixture to a substrate (e.g. concrete). At the same time, the use of my system at such low viscosities results in the production of higher non-volatile wet coatings (as compared to the unimproved coating systems when used at the same viscosity). This is because the solvent in my system is not entirely lost by evaporation but rather chemically combines with the epoxy and the polyester to thereby become part of the cured coating. Also, anti-pollution ordinances have been suggested which would require industry to recover volatile solvents. Unlike the inert or non-reactive solvents which escape from the wet films by evaporation and would require such solvent recovery, my reactive or co-polymerizable solvents, for the most part, remain in the films.

THE ACIDIC UNSATURATED POLYESTER

According to my invention, acidic unsaturated polyesters are first prepared (e.g. prepared according to the teachings of U.S. 3,218,274) using as a part of the ester-forming ingredients, (1) a copolymerizable polycarboxylic acid or anhydride containing ethylenic unsaturation (e.g. maleic acid or anhydride), (2) chlorendic acid (i.e. hexachloroendomethylene tetrahydrophthalic acid) and (3) optionally a copolymerizable polyhydric alcohol containing ethylenic unsaturation (e.g. di-allyl ether of trimethylolpropane). Optionally (but less preferably) reactive ethylenic sites may also be introduced into a polyester by the use of monocarboxylic acids containing ethylenic unsaturation.

The acidic unsaturated polyesters are ordinarily and preferably the simple esterification reaction products of only polyhydric alcohols and only polycarboxylic acids (or anhydrides). Thus, I ordinarily prefer to exclude monocarboxylic acids and monohydric alcohols from the esterification reaction zone. The resulting polyesters can be viewed as acidic partial esters or as carboxyl-terminated polyesters having an average of at least two free carboxyl groups per polyester molecule.

The esterification reaction product can be represented by the structural formula:

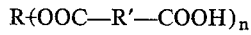

wherein $n$ is at least two (e.g. three or four), wherein R is polyhydric alcohol residue, and wherein R' is polycarboxylic acid residue.

The esterification reaction may also yield some polymeric polyester, as well as some unreacted polycarboxylic acid and/or unreacted polyhydric alcohol. In any event, the predominant species or product of the esterification reaction is a carboxyl-terminated polyester. It should be understood that more than two hydroxyl groups in a polyhydric alcohol can be esterified with polycarboxylic acid. For example, all three hydroxyl groups in trimethylolpropane can be esterified with a mixture of maleic anhydride and chlorendic acid. Thus, the simple formula represented above should only be considered as illustrative of the type of material herein contemplated.

Suitable polyhydric alcohols include ethylene glycol, propylene glycol, glycerol, trimethylol ethane, trimethylol propane, sorbitol, pentaerythritol, dipentaerythritol, tripentaerythritol, and the like. Typically, these polyhydric alcohols will contain 2–20 (e.g. 3–15) carbon atoms and 2 or more (e.g. 3–8) hydroxyl groups. Mixtures of polyhydric alcohols can be employed. The saturated aliphatic polyhydric alcohols, particularly those saturated aliphatic polyhydric alcohols having three or more hydroxyl groups, are preferred. Pentaerythritol (pure or technical grade) is especially preferred. Optionally, but less preferably, some monohydric alcohols can be used in addition to the polyhydyric alcohols.

Although good results can be obtained by using only the saturated aliphatic polyhydric alcohols to prepare the polyester curing agents, I prefer to use a mixture of (1) saturated polyhydric alcohols and (2) polyhydric alcohols which are also allyl ethers. Such mixtures will typically contain from 40–90 mole percent of the saturated polyhydric alcohol(s) with the remainder (i.e. 60–10 mole percent) being the allyl ether(s). One advantage of using polyhydyric alcohols which are also allyl ethers is that the surface cure of thin films of the resulting unsaturated polyester/epoxy mixture is enhanced. In the prior art, waxes and other materials have been used to improve the surface curing characteristics of unsaturated polyester resins, which cure is otherwise believed to be retarded by contact with the air. To the contrary, thin films prepared from my preferred epoxy/polyester coating system are capable of drying or curing to a tack-free state in a reasonable period of time without the use of wax or other surface conditioners.

Suitable allyl ethers are the mono- and poly-allyl ethers of the common polyhydric alcohols previously described. Such allyl ethers include the mono-allyl ether of trimethylol propane, the mono-allyl ether of ethylene glycol, the mono-allyl ethers of pentaerythritol, the mono-allyl ethers of sorbitan, the mono-allyl ethers of glycerol, the di-allyl ethers of pentaerythritol, the tri-allyl ethers of mannitol, and the like. If desired, the alkyl substituted (e.g. $C_1$–$C_6$ alkyl substituted) allyl ethers can be used (e.g. ethallyl ethers, methallyl ethers, etc.). Particularly preferred polyhydric alcohols which are also allyl ethers are the allyl ethers of saturated aliphatic polyhydric alcohols having at least three (3) free hydroxyl groups (e.g. the mono-allyl ether of trimethylol propane).

According to the present invention, a mixture of polycarboxylic acids is used to form the acidic polyester curing agents.

Since it is necessary to introduce a copolymerizable ethylenic bond into the acidic polyester curing agent, part (e.g. 5 to 90 mole percent) of the total amount of polycarboxylic acid must be a copolymerizable ethylenically unsaturated polycarboxylic acid (or anhydride), or a mixture thereof. The preferred unsaturated copolymerizable polycarboxylic acid is maleic acid (or its anhydride). Other suitable copolymerizable polycarboxylic acids are itaconic acid, citraconic acid, fumaric acid and the like. Generally, the copolymerizable polycarboxylic acid (or mixture thereof) will amount to from 10–75 mole percent, preferably 15–40 mole percent, e.g. 25 mole percent of the mixture of polycarboxylic acids.

Chlorendic acid (i.e. hexachloroendomethylene tetrahydrophthalic acid) will always be used as part of the mixture of polycarboxylic acids employed. At least 5 mole percent of chlorendic acid and more usually from 25–75 mole percent of the mixture will be chlorendic acid.

Other polycarboxylic acids can be included in this mixture of polycarboxylic acids. Such other acids include trimellitic acid, tetrachlorophthalic acid, tetrahydrophthalic acid, monochlorophthalic acid, hexahydrophthalic acid, and the like. The corresponding anhydrides can also be used.

A particularly preferred mixture of polycarboxylic acids is one containing only (1) chlorendic acid, (2) maleic acid or maleic anhydride and (3) one or more phthalic acids (or anhydrides). Especially preferred is such a mixture wherein the only phthalic acid present is phthalic anhydride. Optionally, but less preferably, a mixture of polycarboxylic acid and monocarboxylic acid can be used. Such monocarboxylic acids include, for example, the mono-alkyl esters of fumaric, maleic or itaconic acids.

For purposes of this disclosure, I do not consider the benzene carboxylic acids (e.g. phthalic acid) to possess a copolymerizable double bond.

In preparing the acidic unsaturated polyester curing agents of this invention, the ratio of the total number of carboxyl groups in all of the polycarboxylic acids to the total number of hydroxyl groups in all of the polyhydric alcohols (i.e. the ratio before any esterification takes place) should be within the range of from 1:1 to 3:1. Preferably, this ratio will be within the range of from 1.5:1 to 2.2:1, and even more preferably about 1.8 carboxyl groups for each hydroxyl group. For purposes of making the aforementioned calculation, anhydride groups are treated as being the equivalent of two (2) carboxyl groups.

The esterification reaction is ordinarily conducted in the manner illustrated by the specific examples (hereinafter set forth) to preferably react most or all of the available hydroxyl groups. Typically, the acidic polyester thus obtained will contain an average of 2 or more (e.g. 3 or 4) free carboxyl groups per molecule. The acidic polyester should have an acid value at 100% nonvolatile (NV) of at least 50, and preferably of at least 100. Acid values over 140 (e.g. about 150 to 200) are especially desirable.

THE POLYMERIZABLE VINYL MONOMER

The unsaturated polyester will usually and preferably be diluted with, for example, from 5 to 300 weight percent, generally from 5 to 100 weight percent, preferably from 10 to 60 weight percent, e.g. 20 to 50 weight percent, of a polymerizable vinyl monomer. The percentages just referred to are based on the weight of the acidic unsaturated polyester. Alternatively, the unsaturated polyester can be diluted with an inert solvent (e.g. xylene) and the polymerizable vinyl monomer can be kept separate. Then, the polyester, vinyl monomer and epoxy component can be mixed at the time of use. The amount of vinyl monomer in the final mixture will approximate the amounts previously given with reference to the usual dilution of the unsaturated polyester. Other alternatives will be apparent. Such alternatives are less preferred techniques.

Suitable polymerizable vinyl monomers (i.e. those monomers containing the reactive $CH_2=C<$ group) are styrene, vinyl toluene, divinyl benzene, α-methyl styrene, chloro- and fluorostyrenes, diallyl phthalate, dimethallyl phthalate, triallyl cyanurate, allyl diglycolate, diallyl phenyl phosphonate, di-ethylene glycol bis (allyl carbonate), 1,2-propylene glycol bis (allyl carbonate), bis (allyl lactate) carbonate, allyl succinyl allyl glycolate, allyl maleate, methallyl maleate, vinyl acetate, allyl acetate, and the like, as well as the $C_1-C_{18}$ alkyl and $C_1-C_{18}$ alkoxy alkyl esters of acrylic and methacrylic acids. Examples of the acrylic monomers are methyl acrylate, ethyl acrylate, n-propyl acrylate, isopropyl acrylate, n-butyl acrylate, isobutyl acrylate, n-amyl acrylate, isoamyl acrylate, hexyl acrylate, 2-ethylhexyl acrylate, octyl acrylate, 3,5,5-trimethylhexyl acrylate, decyl acrylate, methyl methacrylate, 2-ethylhexyl methacrylate, octadecyl acrylate, octadecenyl acrylate, ethyl methacrylate, n-propyl methacrylate, isopropyl methacrylate, butyl methacrylate, n-amyl methacrylate, sec.-amyl methacrylate, methyl methacrylate, 2-ethylhexyl methacrylate, octyl methacrylate, 3,5,5-trimethylhexyl methacrylate, decyl methacrylate, dodecyl methacrylate, octadecyl methacrylate, butoxyethyl acrylate, butoxyethyl methacrylate, other alkoxyalkyl acrylates or methacrylates, and the like. Mixtures of two or more polymerizable monomers can be used (e.g. a mixture of ethyl acrylate and styrene). Styrene, vinyl toluene, and the $C_1-C_5$ alkyl esters of methacrylic acid (e.g. butyl methacrylate or methyl methacrylate) are the preferred monomers. Styrene is especially preferred.

These reactive monomers can be used as the only solvents for the polyesters, or can be used in admixture with inert organic solvents such as xylene, Cellosolve acetate, and the like.

POLYMERIZATION CATALYSTS

In polymerizing the vinyl monomers and the unsaturated polyesters, common polymerization catalysts can be used. Suitable polymerization catalysts are azo-bis-isobutyronitrile, benzoyl peroxide, acetyl benzoyl peroxide, hydroxy-heptyl peroxide, methyl ethyl ketone peroxide, cyclohexanone peroxide, cyclohexyl hydroperoxide, 2,4-dichlorobenzoyl peroxide, cumene hydroperoxide, t-butyl hydroperoxide, methyl amyl ketone peroxide, acetyl peroxide, lauroyl peroxide, benzoyl peroxide, methyl cyclohexyl hydroperoxide, p-chlorobenboyl peroxide, di-t-butyl peroxide, peracetic acid, t-butyl permaleic acid, di-t-butyl diperphthalate, t-butyl perphthalic acid, t-butyl peracetate and the like. Mixtures of two or more of the above catalysts can be utilized, as can redox catalyst systems. Similarly, accelerators (e.g. cobalt naphthenate) can be used in combination with the polymerization catalysts.

The polymerization catalyst is ordinarily used in an amount of about 0.1 percent to 5 percent by weight of the polyester resin component, although larger or smaller amounts can be used depending upon the rate at which it is desired to have the polymerization proceed. Other suitable organic catalysts and accelerators can be employed.

USE OF THE ACIDIC POLYESTER AND VINYL MONOMER

The acidic unsaturated polyester, typically as a solution or mixture with the polymerizable vinyl monomer, will ordinarily be used as a co-reactant or curing agent with various epoxy components. Thus, for coatings applications, an epoxy component (e.g. epoxidized soybean oil or a bisphenol-epichlorohydrin resin), a vinyl monomer, and the acidic polyester curing agent will be mixed together in the presence of a vinyl polymerization catalyst, usually in a ratio of 50 to 150 parts by weight of acidic polyester per 100 parts by weight of epoxy component. The resulting mixture (which can optionally include various pigments, fillers, extenders, dyes, driers, stabilizers, and the like) is then applied in film form to a suitable substrate. These wet films are then cured to a tack-free state. Curing can be by air-drying at room temperature or can be accelerated by baking. Partial pre-reaction of the components and catalysis can be used to speed the curing or drying time. However, it should be noted that the epoxy and the polyester can co-react and cure in the absence of any additional or supplemental curing agent for the epoxy. Although supplemental curing agents or catalysts (e.g. various amines) for the epoxy component can be used, the preferred epoxy/polyester system of the present invention is capable of curing in thin films (e.g. 3 mil films) to a tack-free state at room temperature in the absence of any additional curing agent for the epoxy component and in the further absence of the application of extraneous heat. The cured films can be stripped from the substrate (provided a smooth substrate has been used) to thereby obtain free (i.e. unsupported) films.

If desired, the unsaturated acidic polyester curing agents of this invention can be blended with other acidic polyester curing agents (e.g. the curing agents of U.S. 3,218,274) and this mixture used in combination with the epoxy component as an improved coating system.

Suitable epoxy components are the epoxidized fatty compounds (e.g. epoxidized linseed oil), the bisphenol-epichlorohydrin resins (e.g. Epon 828), various alicyclic diepoxides (e.g. Unox 201), etc. Because of differences in performance (e.g. as reflected by the speed of drying, hardness, flexibility, tendency to yellow, and the like), I prefer to employ an epoxidized fatty compound (or a mixture thereof) as the predominant (i.e. more than 50 weight percent of the epoxy component) or sole epoxy component. Such epoxidized fatty compounds include epoxidized fatty oils (e.g. epoxidized soybean oil), epoxidized fatty acid esters of monohydric alcohols (e.g. epoxidized methyl oleate), epoxidized fatty acid esters of polyhydric alcohols (e.g. epoxidized tetra(tall oil) ester of pentaerythritol), epoxidized fatty nitriles (e.g. epoxidized oleyl nitrile), epoxidized fatty amides, epoxidized fatty amines, and epoxidized fatty alcohols. Such epoxidized fatty compounds are already well known in the art. Typically, these epoxidized fatty compounds wall have 8 to 26 carbon atoms, e.g. 12 to 22 carbon atoms, in each of the fatty radicals and have an internal oxirane value of from 3% to 10%. I prefer that the oxirane value of the epoxidized fatty compounds be at least 5.5%.

Particularly preferred for use as the epoxy component of this invention are the curable epoxidized esters of fatty acids. These epoxidized esters, having internal oxirane, will generally contain from 8 to 26 carbon atoms, e.g. 12 to 22 carbon atoms, in the fatty radicals and 1 to 10 carbon atoms in the mono- or polyhydric alcohol portion, with or without internal oxirane groups in the alcohol portion. Thus, the following epoxidized fatty acid esters are contemplated for use in this invention: epoxidized soybean oil; epoxidized linseed oil; epoxidized safflower oil; epoxidized 2-ethylhexyl tallate, epoxidized 1,5-pentanediol dioleate; epoxidized 1,2,6-hexanetriol dioleate mono-acetate; epoxidized methyl oleate; epoxidized glycerol trilinoleate; epoxidized glycerol trioleate; epoxidized glycerol mono-oleate; epoxidized glycerol mono-linoleate; epoxidized glycerol monostearate dilinoleate; epoxidized esters of mono-, di- or polypentaerythritol with soy, tall or linseed fatty acids; and the like. Mixtures of these esters can be used.

If desired, epoxidized compounds of different types and oxirane values can be blended together to obtain various properties, e.g. improved resistance to yellowing, improved drying speed, and the like. However, it should be realized that improvements in certain properties are usually accompanied by a decrease in some other property. Where a mixture of epoxidized fatty compounds has been used, I prefer that the mixture have an average internal oxirane value of at least 5.5%.

The present invention will be further understood by reference to the following specific examples which include a preferred embodiment. Unless otherwise indicated, all parts and percentages are by weight. In these examples, the acid numbers of all unsaturated acidic polyester curing agents were above 100 on a 100% NV basis.

Example I

| Ingredients: | Weight, grams |
|---|---|
| Pentaerythritol (technical grade) | 60.8 |
| Phthalic anhydride | 74 |
| Maleic anhydride | 49 |
| Chlorendic acid | 386.3 |
| Monoallyl ether of trimethylol propane | 53.5 |
| Styrene | 297 |
| Xylene | 260.2 |

Into a three-necked round bottomed flask fitted with an agitator, thermometer, nitrogen inlet tube, water trap and reflux condenser were added all the ingredients except styrene. The mixture was heated to 270° F. where water began to azeotrope off with the xylene. After 22 grams of water were collected, the reaction stopped. Additional heat was then applied with a rapid nitrogen sparge to remove xylene. When the temperature had increased to 320° F., 114 grams of xylene had been removed. The polyester resin solution (now having a non-volatile content of 84%) was then cooled to 240° F. Next, 297 grams of styrene were then added, reducing the temperature rapidly to 170° F. The resin solution was cooled to room temperature. The final polyester resin solution contained 58% of the acidic unsaturated polyester and 22% styrene, with the remainder being xylene.

A portion (50 grams) of this solution was mixed with 33 grams (90% NV) of a mixture of epoxidized soybean oil and epoxidized linseed oil. To this mixture was added 0.7 gram of a 40% methyl ethyl ketone peroxide solution and 0.1 gram of a 6% cobalt naphthenate solution. A 0.003 inch wet film was cast on glass and baked at 250° F. for 10 minutes to thereby cure the film. The cured film had a Sward hardness of 20 which increased to 34 after two days and further increased to 42 after one week. In comparison to prior art polyester/epoxy films (i.e. without the styrene monomer and allyl ether; see U.S. 3,218,274), the cured film of this example had a greater degree of toughness.

Example II

| Ingredients: | Weight, grams |
|---|---|
| Pentaerythritol (technical grade) | 60.8 |
| Maleic anhydride | 78.4 |
| Chlorendic acid | 450 |
| Monoallyl ether of trimethylol propane | 53.5 |
| Hydroquinone | .6 |
| Xylene | 156 |
| Styrene | 261 |

All of the ingredients except styrene were charged and processed as in Example I. 28 grams of water were obtained. Then, 53 grams of xylol were removed (below 300° F.) to increase the non-volatile content to 86%. The styrene was added at 260° F. which cooled the reaction mixture to 188° F. After further cooling to room temperature, 148 grams of Cellosolve acetate were added. The final resin solution contained 55% of the acidic polyester and 23% styrene, with the balance being a mixture of xylene and Cellosolve acetate.

To 38 grams of this solution were added 20 grams (90% NV) of a mixture of epoxidized soybean oil and epoxidized linseed oil, one gram of a 40% methyl ethyl ketone peroxide solution, and 0.2 gram of a 6% cobalt naphthenate solution. A 0.003 inch wet film was cast on glass and dried overnight at room temperature to a Sward hardness of 14. A 5% sodium hydroxide solution had no visible effect on the cured film after 30 minutes contact. Only a slight loss of adhesion was noticed.

For comparative purposes, a similar polyester composition was prepared without the allyl ether and styrene. Films prepared in the same manner from this prior art epoxy/polyester system cured overnight at room temperature to a Sward hardness of 12. This film was not as tough as the film of this example. In addition, a 5% sodium hydroxide solution caused a severe whitening of this comparative film in only 30 minutes and caused a complete loss of adhesion of the film to the substrate.

To demonstrate that the styrene copolymerized in the clear films of this example, gravimetric film data were obtained to find the weight and percent styrene loss of both baked and room temperature cured films. For this purpose, 0.003 inch films of the coating composition of this example were prepared. One film was baked at 250° F. for 20 minutes and the other was cured overnight (16 hours) at room temperature.

| | Baked | Room temp. |
|---|---|---|
| Theoretical NV of the film, percent | 81 | 81 |
| Actual NV of the film, percent | 73 | 80 |
| Percent total NV loss | 8 | 1 |
| Percent total Styrene loss | 31 | 4 |

As exhibited from this data, most of the styrene copolymerized in the room temperature cured film while baking caused a portion of the styrene to evaporate before it could be polymerized.

Example III

| Ingredients: | Weight, grams |
|---|---|
| Pentaerythritol | 42 |
| Phthalic anhydride | 37 |
| Chlorendic acid | 193.2 |
| Maleic anhydride | 24.5 |
| Hydroquinone | 0.3 |
| Styrene | 143 |
| Methyl isobutyl ketone | 73 |

All of the ingredients except styrene were charged and processed as in Example I. 10.5 grams of water were obtained during 2.5 hours; then the reaction was stopped and the contents of the flask cooled. When the temperature reached 240° F., all of the styrene was added rapidly. The final polyester resin solution contained 57% polyester, 28% styrene and 15% methyl isobutyl ketone.

A 15 gram portion of the polyester solution just prepared was mixed with 9 grams of epoxidized tall oil ester of dipentaerythritol (internal oxirane of 5.74%), 0.6 gram of a 40% solution of methyl ethyl ketone peroxide and 7 drops of a 6% cobalt naphthenate solution. Next, a 0.003 inch wet film of this solution was cast on glass and allowed to cure at room temperature. After 2.5 hours, the film passed the 200 gram Zapon test. After 5 hours, it passed the 500 gram Zapon test. The Sward hardness was 24 after 24 hours. After 12 days, the Sward hardness had increased to 44.

Analysis of the film showed that 72% of the styrene had reacted and remained in the film. The remainder of the styrene was lost by evaporation.

The cured film was not visibly affected by direct contact with a 5% aqueous sodium hydroxide solution for 30 minutes.

From the foregoing examples and description is should be clear that the acidic unsaturated polyesters of the present invention can be used in combination with vinyl monomers to cure a variety of epoxidized components. By varying the amounts and types of the various reactants and catalysts, it is possible to obtain a wide variety of film properties. For example, coatings ranging from soft, flexible primers to hard mar-resistant finishes can be obtained. These and similar epoxy/polyester systems can be used to form free films, as caulking compounds, casting resins, laminating resins, adhesives, etc. If desired, the modified polyesters can be blended with other compatible epoxy curing agents.

Although the present invention has been described with a certain degree of particularity, it will be realized that numerous modifications and variations, as well as uses (e.g. as sealants, etc.) falling within the spirit and scope

What is claimed is:

1. A composition which comprises:
   (a) a curable epoxidized compound comprising an epoxidized ester of fatty acid or a mixture of such esters, said esters having an internal oxirane value of from 3 to 10 percent and containing 8 to 26 carbon atoms in each fatty radical;
   (b) an unsaturated polyester having an acid value of at least 100, said polyester being the esterification reaction product of polycarboxylic acid and polyhydric alcohol wherein the ratio of carboxyl groups to hydroxyl groups before esterification is from 1:1 to 3:1, said polycarboxylic acid being a mixture of polycarboxylic acids comprised of 5–90 mole percent copolymerizable ethylenically unsaturated polycarboxylic acid and at least 5 mole percent hexachloro endomethylene tetrahydrophthalic acid; and
   (c) a polymerizable vinyl monomer.

2. The composition of claim 1:
   (a) wherein said ratio of carboxyl groups to hydroxyl groups is within the range of 1.5:1 to 2.2:1; and
   (b) wherein said vinyl monomer is styrene.

3. The composition of claim 2:
   (a) wherein said epoxidized ester has an average oxirane value of at least 5.5%;
   (b) wherein from 50–150 parts by weight of said unsaturated polyester are present per 100 parts by weight of said epoxy component; and
   (c) wherein from 10–60 weight percent of styrene is present based on the weight of said unsaturated polyester.

4. The composition of claim 3 which also includes:
   (a) inert solvent, and
   (b) vinyl polymerization catalyst.

5. The composition of claim 4:
   (a) wherein said polycarboxylic acid is a mixture of maleic anhydride, hexachloroendomethylene tetrahydrophthalic acid, and one or more phthalic acids, only;
   (b) wherein said polyhydric alcohol comprises pentaerythritol and an allyl ether of a $C_3$–$C_{15}$ saturated aliphatic polyhydric alcohol; and
   (c) wherein said acid value is at least 100.

6. The composition of claim 5 wherein said polymerization catalyst comprises methyl ethyl ketone peroxide and wherein an accelerator is also present.

7. Product obtained by curing the composition of claim 1 in the presence of vinyl polymerization catalyst.

8. The cured film obtained by applying the composition of claim 1 in admixture with vinyl polymerization catalyst to a substrate and thereafter curing said composition on said substrate.

9. The cured coating obtained by applying the composition of claim 6 to a substrate and thereafter curing said composition.

10. The process of preparing a coating which comprises mixing components (a), (b), and (c) of claim 1 in the presence of vinyl polymerization catalyst, applying said mixture in a thin film to a substrate, and thereafter curing said composition on said substrate to a tack-free state in the absence of any curing agent for said epoxy other than an acidic polyester and in the further absence of the application of extraneous heat.

References Cited

UNITED STATES PATENTS

| | | | |
|---|---|---|---|
| 2,537,949 | 1/1951 | Adams | 260—22 |
| 2,647,092 | 7/1953 | Meeske et al. | 260—22 |
| 2,653,141 | 9/1953 | Greenlee | 260—18 |
| 2,852,487 | 9/1958 | Maker | 260—861 |
| 2,966,479 | 12/1960 | Fischer | 260—78.4 |
| 3,112,284 | 11/1963 | Greenlee et al. | 260—22 |
| 3,218,274 | 11/1965 | Boller et al. | 260—22 |
| 3,258,438 | 6/1966 | Shaw et al. | 260—22 |
| 3,287,293 | 11/1966 | Dalibor | 260—22 |
| 3,109,827 | 11/1963 | Fysh | 260—22 |
| 3,331,815 | 7/1967 | Kokorudz et al. | 260—78.4 |

DONALD E. CZAJA, Primary Examiner

R. W. GRIFFIN, Assistant Examiner

U.S. Cl. X.R.

117—124, 132, 148, 161, 167; 260—23, 32.8, 33.6, 40, 41, 861

UNITED STATES PATENT OFFICE
CERTIFICATE OF CORRECTION

Patent No. 3,516,955          Dated June 23, 1970

Inventor(s)    David D. Taft

It is certified that error appears in the above-identified patent and that said Letters Patent are hereby corrected as shown below:

Column 5, line 16 should be canceled and the following inserted therefor:    -- late, lauryl acrylate, dodecyl acrylate, cetyl acrylate --.

Signed and sealed this 20th day of July 1970.

(SEAL)
Attest:

EDWARD M. FLETCHER, JR.                WILLIAM E. SCHUYLER, JR.
Attesting Officer                      Commissioner of Patents